US007458805B2

(12) United States Patent
Morency et al.

(10) Patent No.: US 7,458,805 B2
(45) Date of Patent: Dec. 2, 2008

(54) GRIPPING AND POSITIONING TOOL FOR MOLDING MACHINE

(75) Inventors: Sylvain-Paul Morency, Laval (CA); Léonard Desaulniers, Beloeil (CA); Régis Métivier, Montréal (CA); Robert Battaglia, Montréal (CA)

(73) Assignee: Axium Inc. (CA)

( * ) Notice: Subject to any disclaimer, the term of this patent is extended or adjusted under 35 U.S.C. 154(b) by 157 days.

(21) Appl. No.: 11/332,502

(22) Filed: Jan. 13, 2006

(65) Prior Publication Data
US 2006/0216368 A1   Sep. 28, 2006

Related U.S. Application Data

(60) Provisional application No. 60/643,164, filed on Jan. 13, 2005.

(51) Int. Cl.
*B29C 45/42* (2006.01)

(52) U.S. Cl. ..................................... 425/556; 264/334
(58) Field of Classification Search ................. 425/556, 425/334; 264/334
See application file for complete search history.

(56) References Cited

U.S. PATENT DOCUMENTS 5,334,009 A * 8/1994 Urbanek et al. ............. 425/556

* cited by examiner

*Primary Examiner*—Tim Heitbrink
(74) *Attorney, Agent, or Firm*—Muirhead and Saturnelli, LLC

(57) ABSTRACT

A gripping and positioning tool to properly position elements into an open mold of a molding machine is described herein. The tool includes a base that receives the element and that may be moved along three orthogonal axes and tilted in two directions with respect to a fixed plate mounted to an assembly. Furthermore, the tool includes graduated scales to determine the degree of tilting, and fasteners to lock in place the gripping and positioning tool once the proper adjustment for positioning is made.

26 Claims, 9 Drawing Sheets

GRIPPING AND POSITIONING TOOL FOR MOLDING MACHINE

CROSS-REFERENCE TO RELATED APPLICATION

This application claims priority to U.S. provisional patent application No. 60/643,164 filed on Jan. 13, 2005, which is incorporated by reference herein.

FIELD OF THE INVENTION

The present invention generally relates to molding machines. More specifically, the present invention is concerned with a gripping and positioning tool designed to position elements in a molding machine prior to the closing of the mold plates thereof.

BACKGROUND OF THE INVENTION

Molding machines are well known in the art. They usually are provided with two complementary mold plates that are closed to mold a part. In some cases, elements may be carefully positioned in the mold plates prior to their closing so as to embed these elements in the molded part.

The present invention generally relates to a gripping and positioning tool to position these elements.

OBJECTS OF THE INVENTION

An object of the present invention is therefore to provide a gripping and positioning tool for molding machines.

SUMMARY OF THE INVENTION

More specifically, in accordance with the present invention, there is provided a gripping and positioning tool for a molding machine being provided with mold plates that are closeable for molding a part and a robot assembly to position objects prior to the closing of the mold plates, the gripping and positioning tool comprising:

a structure defining a plurality of orthogonal axes and tilting directions, the structure being provided with a movable portion and a fixed portion; the fixed portion being so configured and sized as to be mounted to the robot assembly of the molding machine; the movable portion being so mounted to the fixed portion as to be adjustable along the plurality of orthogonal axes and tilting directions; and a gripping element being mounted to the movable portion of the gripping and positioning tool;

wherein the combination of the tilting movements and the movements along the orthogonal axes provide for positional adjustment of the gripping and positioning tool.

The foregoing and other objects, advantages and features of the present invention will become more apparent upon reading of the following non-restrictive description of illustrative embodiments thereof, given by way of example only with reference to the accompanying drawings.

DETAILED DESCRIPTION OF THE ILLUSTRATIVE EMBODIMENTS

Figure 1:
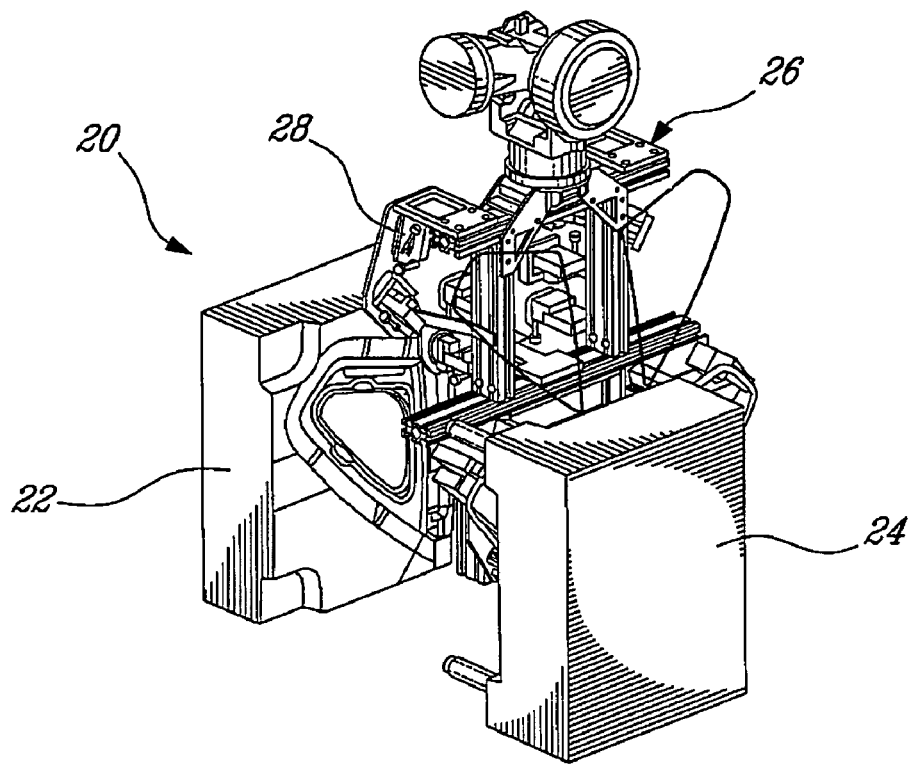
FIG. 1 is a schematic perspective view of a molding machine including a plurality of grippers according to an embodiment of the present invention.
Figure 2:
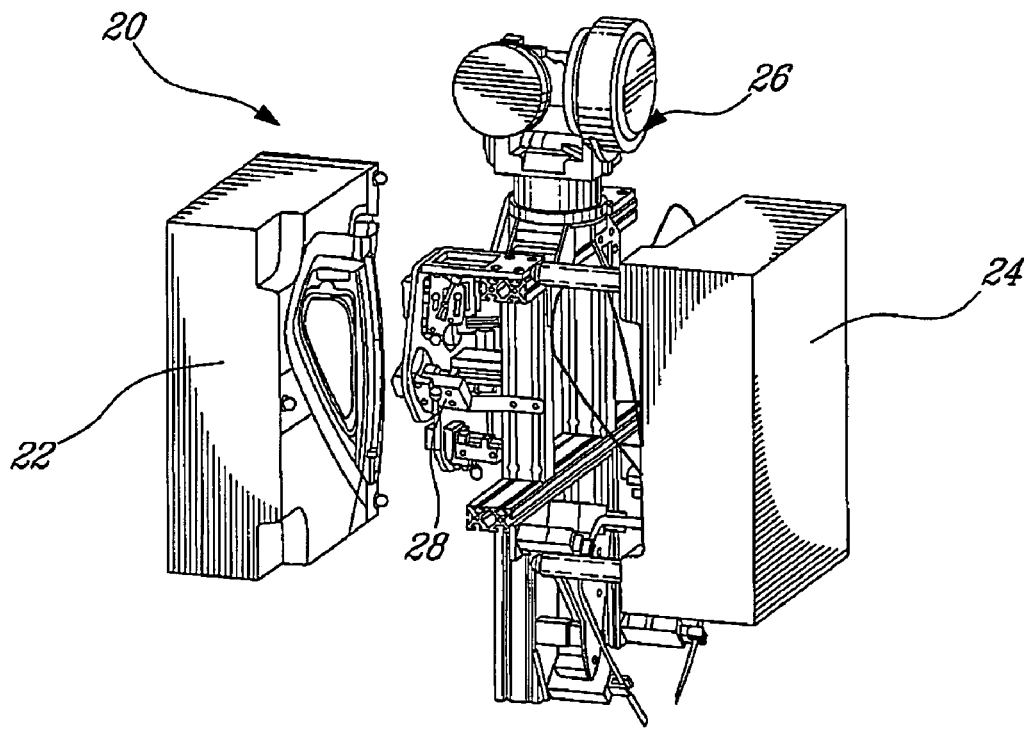
FIG. 2 is a schematic front perspective view of the machine of FIG. 1.
Figure 3:
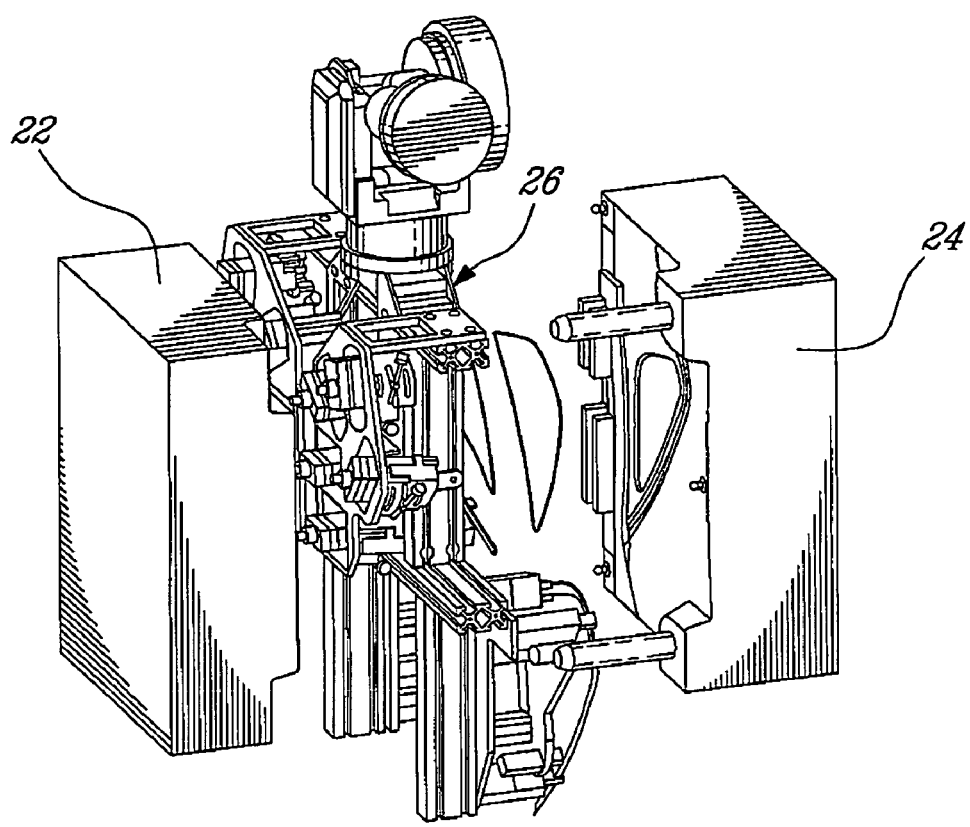
FIG. 3 is another schematic perspective view of the machine of FIG. 1.
Figure 4:
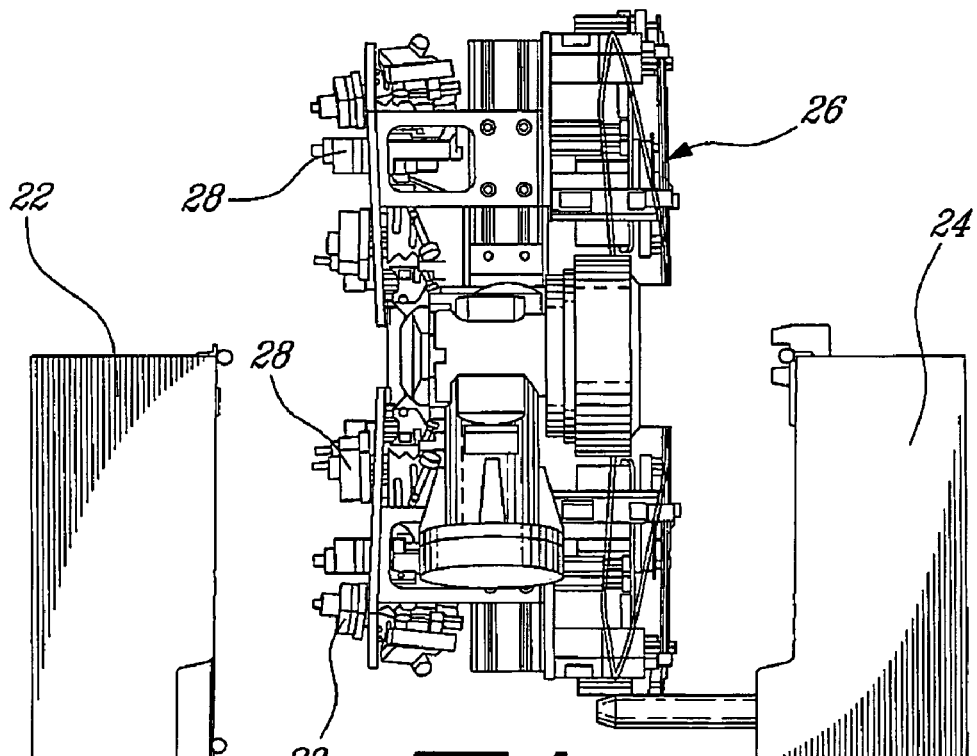
FIG. 4 is a top plan view of the machine of FIG. 1.

FIGS. 1 to 4 of the appended drawings schematically illustrate a molding machine 20 including first and second complementary mold plates 22 and 24 and a robot assembly 26 that may be moved between the plates 22 and 24 when they are opened as illustrated in these figures. The purpose of the robot assembly 26 is to remove the previously molded part and to position elements inside the mold plates so that these elements be embedded in the next molded part. The robot assembly 26 includes, amongst others, gripping and positioning tools 28 (hereinafter referred to as the <<gripper>> 28).

Since molding machines are well known to those of ordinary skill in the art, the structure and operation of the molding machine 20 will not be further discussed in the present specification.

Generally stated, the purpose of the gripper 28 is to precisely position elements into the mold plates while they are open. Therefore the gripper 28 is in the form of a structure defining three orthogonal axes and two tilting directions.

Figure 5:
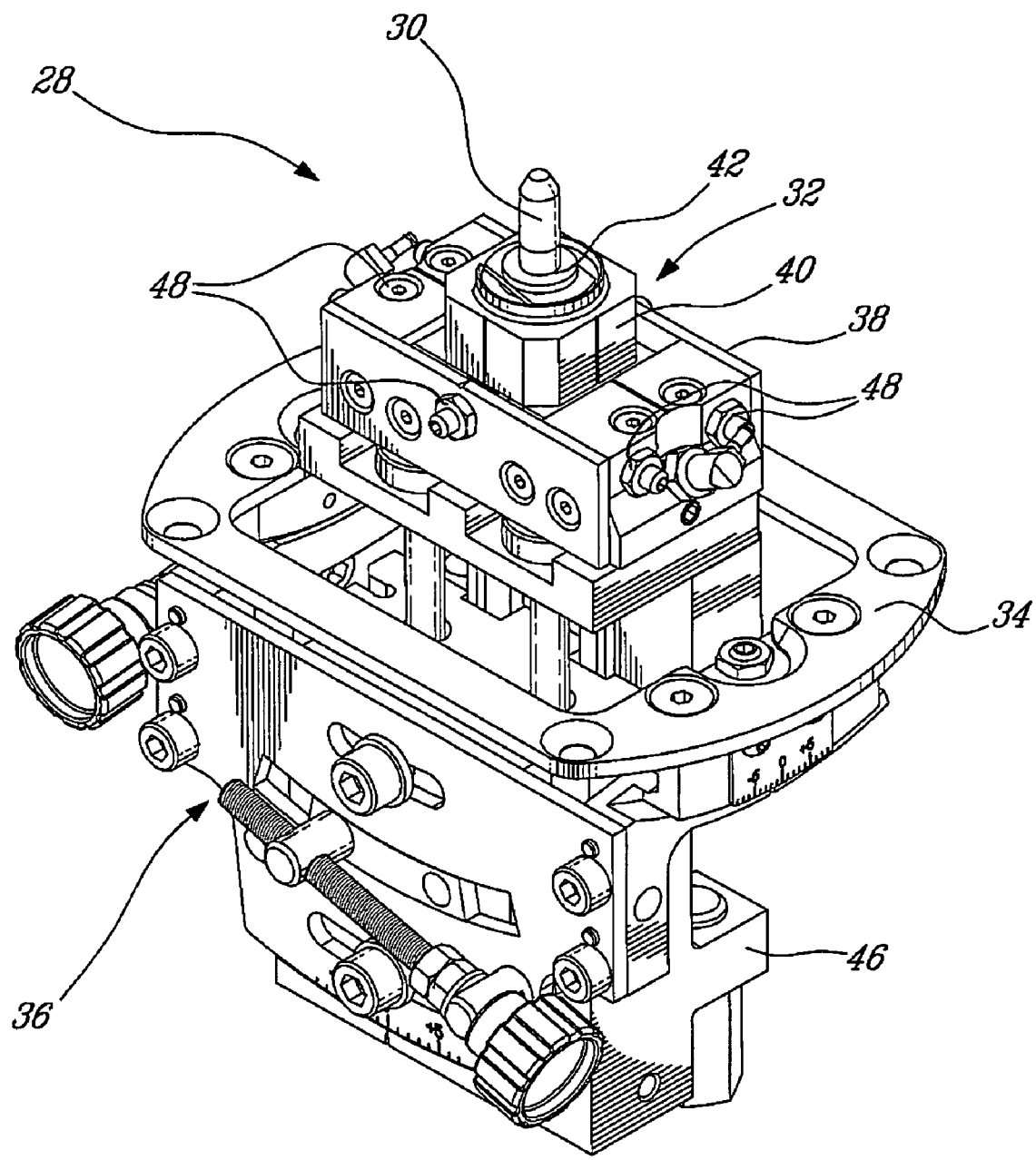
FIG. 5 is a perspective view of a gripper according to an embodiment of the present invention.

FIG. 5 illustrates a gripper 28, configured to grip an element such as a pin 30. The gripper 28 has three main parts, a gripping assembly 32 defining a movable portion, mounted to a fixed plate 34 defining a fixed portion, and an adjusting assembly 36 enabling the gripper 28 to adjust its attitude properly before being positioned and mounted to the robot assembly 26.

Figure 10:
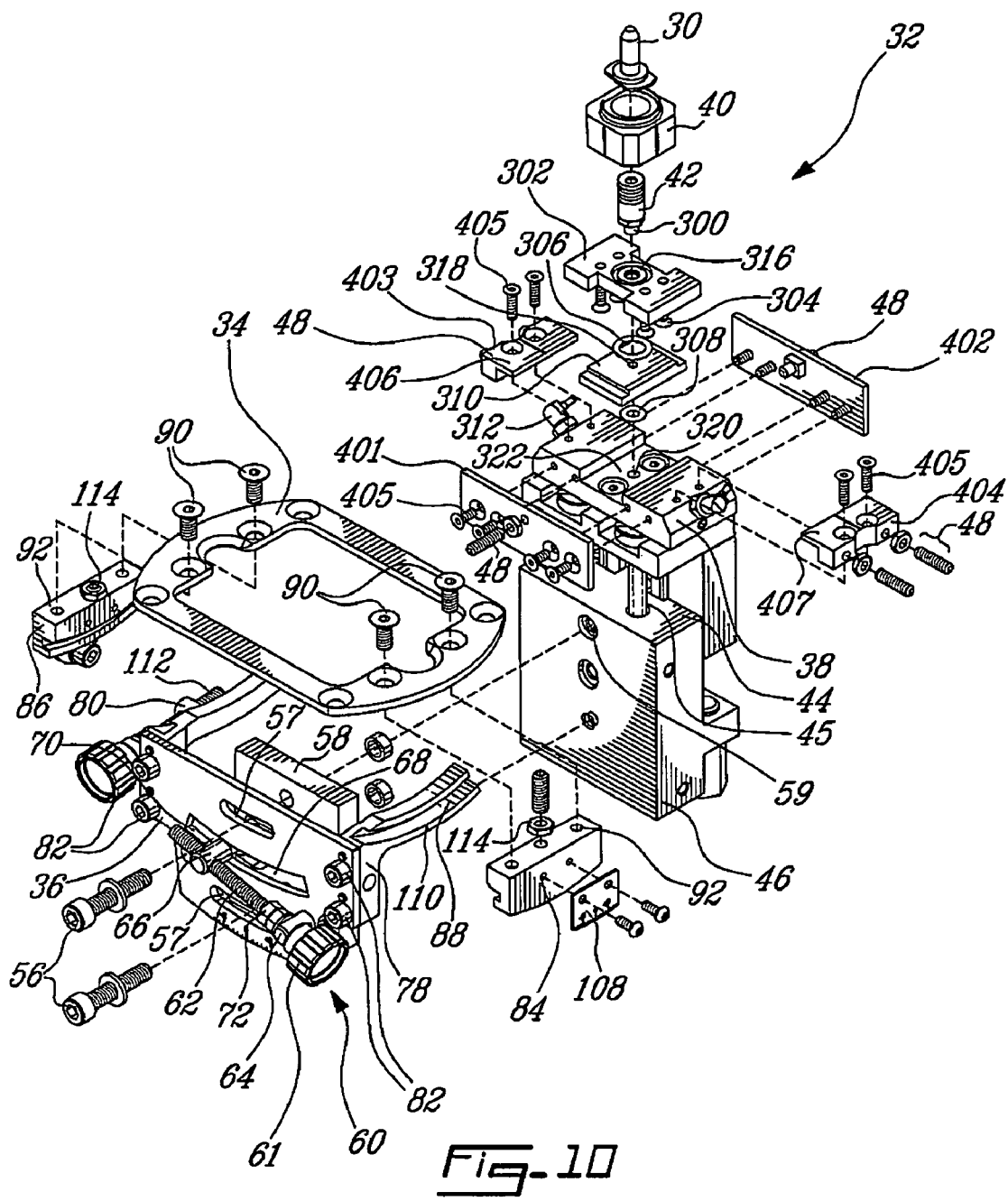
FIG. 10 is an exploded view of the gripper of FIG. 5.

Turning to FIG. 10, the gripping assembly 32 includes a parallelepiped-shaped holder 38, on which is mounted a base 40. The gripping operation is performed through a gripping element, in the form of a suction cup 42, mounted to the base 40. The holder 38 is mounted to a body 46 via a pneumatic cylinder 44.

The suction cup 42 is tubular and comprises a threaded and hollow fitting 300, which is screwed into a threaded aperture 316 in the center of a H-shaped plate 302. This H-shaped plate 302 comprises four fasteners such as 304, for example screws, for fastening the base 40 to the H-shaped plate 302. Also, the H-shaped plate 302 is mounted to the holder 38 via an auxiliary plate 310, which is sandwiched by two O-rings 306 and 308. As illustrated in FIG. 10, the auxiliary plate 310 also fills up a rectangular cavity 322 on the holder 38. Since the assembly comprising O-ring 308, the auxiliary plate 310 and O-ring 306 is squeezed between the rectangular cavity 322 and the H-shaped plate 302, O-ring 306 keeps air tight the junction between a central hole 320 in the holder 38 and a central hole 318 in the auxiliary plate 310. In the same manner, O-ring 306 keeps air tight the junction between the central hole 318 in the auxiliary plate 310 and the threaded and hollow end 300 screwed into the central threaded aperture 316 in the H-shaped plate 302. As also illustrated in FIG. 10, the threaded aperture 316, the hole 318 and hole 320 are axially aligned with each other to create an air-tight passage for withdrawing air through a conduit 312 and thereby produce a suction in cup 42 to retain the element (such as a pin) 30 in place on the suction cup. Finally, O-ring 306 is oversized to keep the junction between the central hole 318 in the auxiliary plate 310 and the threaded and hollow fitting 300 screwed into the central threaded aperture 316 in the H-shaped plate 302 air-tight and unobstructed regardless of translation movements of the H-plate 302 about the holder 38 as will be described herein below.

Figure 6:
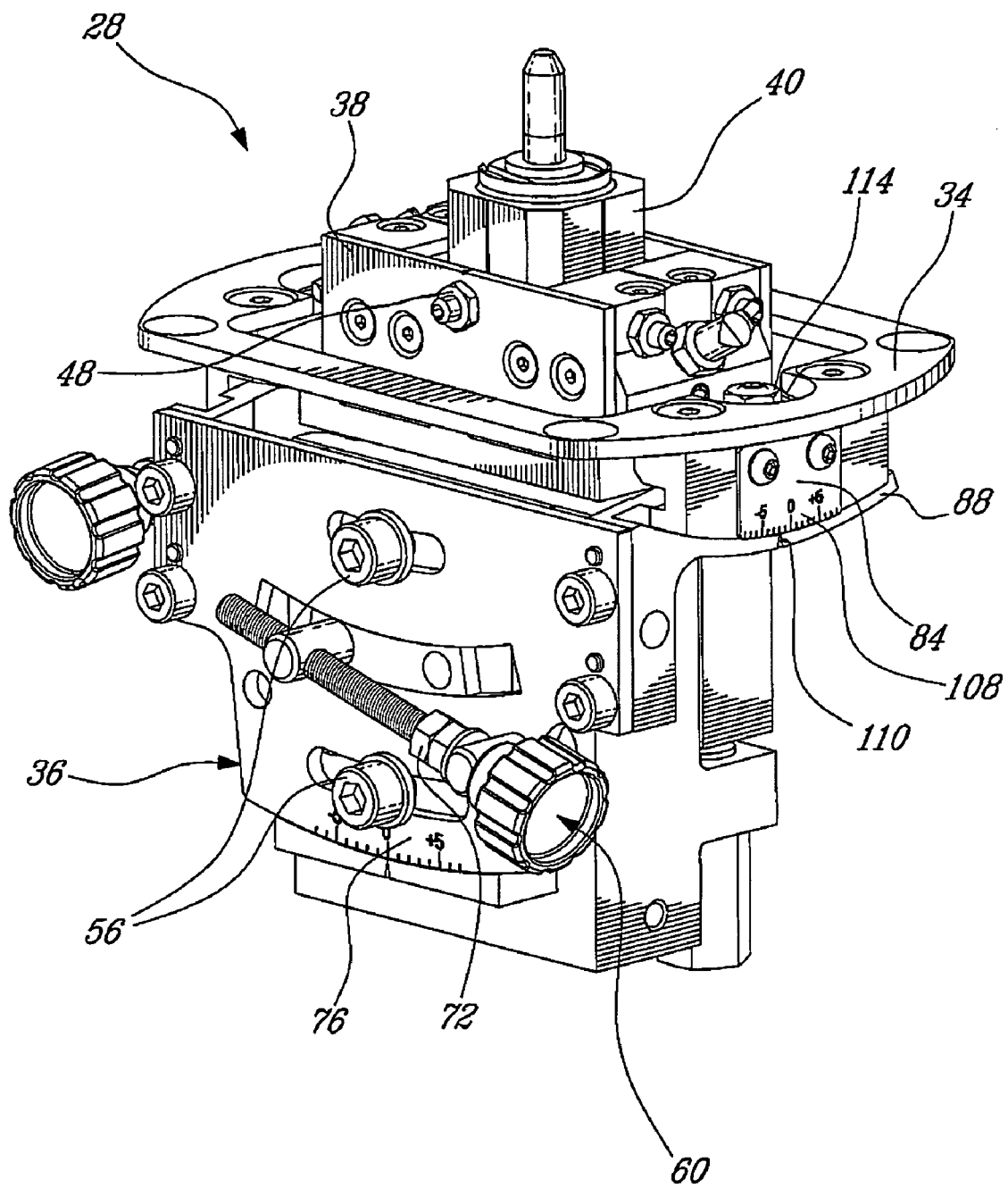
FIG. 6 is a second perspective view of the gripper of FIG. 5.
Figure 9:
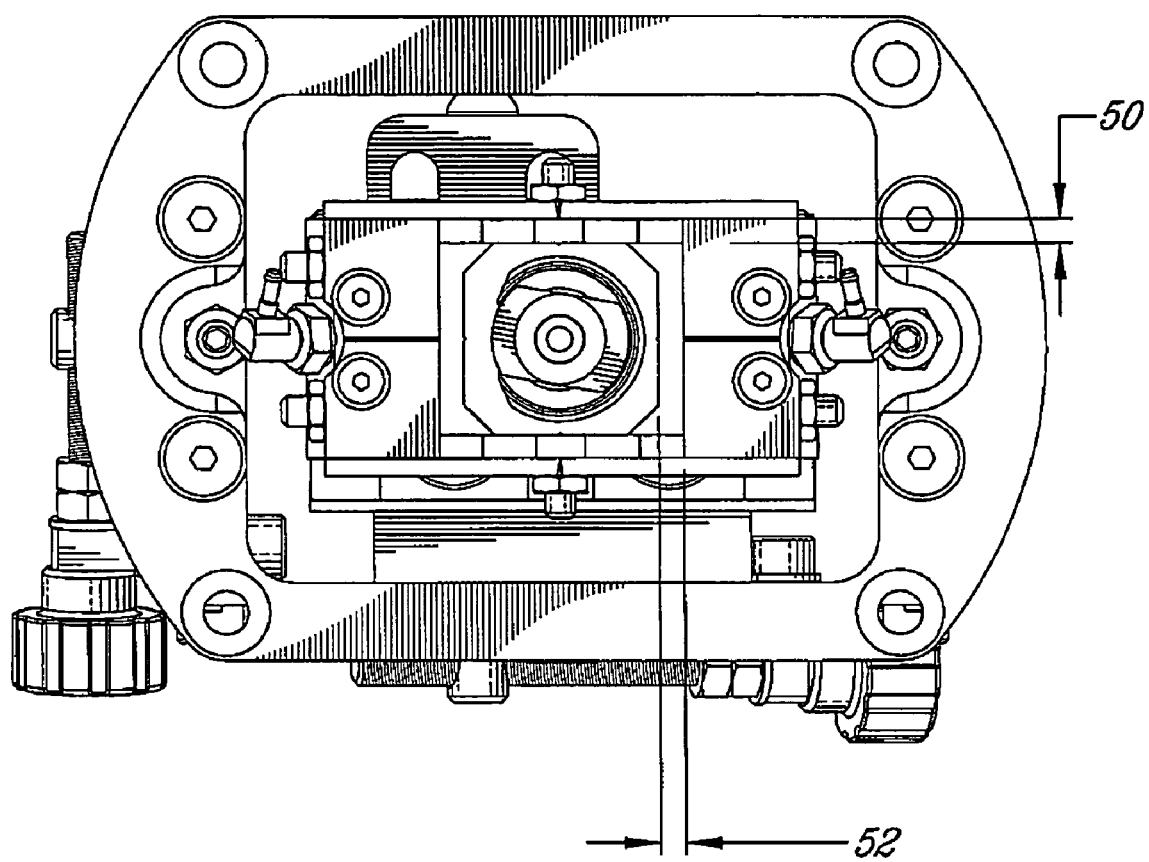
FIG. 9 is a top plan view of the gripper of FIG. 5.

As can be better seen in FIGS. 5 and 6, the base 40 is mounted to the parallelepiped-shaped holder 38 so as to be movable along first and second orthogonal axes. The base 40 has a square pattern that allows the base 40 to be mounted in the four directions. More specifically, the base 40 is mounted to the holder 38 through the H-shaped plate 302 by means of lateral flat plates 401 and 402 (FIG. 10) and L-shaped end members 403 and 404 (FIG. 10) secured to the holder 38 via fasteners 405 (comprising screws and threaded holes in the holder 38). The lateral flat plates 401 and 402 restrict transversal movement of the H-shaped plate 302 and therefore the base 40 while the L-shaped end members 403 and 404 restrict longitudinal movement of the H-shaped plate 302. Also, the L-shaped end members 403 and 404 comprise respective tongues 406 and 407 that retain the H-shaped plate 302 and therefore the base 40 against the surface of the holder 38. Position adjusting members 48 (FIGS. 5 and 10) comprise lock nuts and screws which may be locked in place. More specifically, the position adjusting members are mounted on the lateral flat plates 401 and 402 and the L-shaped end members 403 and 404 and abut against the surface of the H-shaped plate 302 to adjust the position of the base 40 about the holder 38 along the two orthogonal axes. The possible adjustment courses of the base 40 along the two orthogonal axes are illustrated in FIG. 9 (see arrows 50 and 52). They define the two translation movements in the first and second directions. In the non-limiting example shown herein, the translation movement range along the two orthogonal axes is about 6.4 mm.

Returning to FIG. 10, the pneumatic cylinder 44 is part of the body 46. The pneumatic cylinder 44 includes a guided cylinder 45 that allows the gripping assembly 32 to move longitudinally along a third orthogonal axis, according to the direction 47 as shown in FIG. 8B. The longitudinal movement along the third orthogonal axis defines the third translation movement in the direction 47.

The body 46 is mounted to the adjusting assembly 36 via fasteners 56. More specifically, the fasteners 56 go through respective curved slots 57 of the assembly 36, through a support plate 58 before being threaded in respective apertures 59 of the body 46. Accordingly, the support plate 58 is sandwiched between the adjusting assembly 36 and the body 46.

Figure 8A:
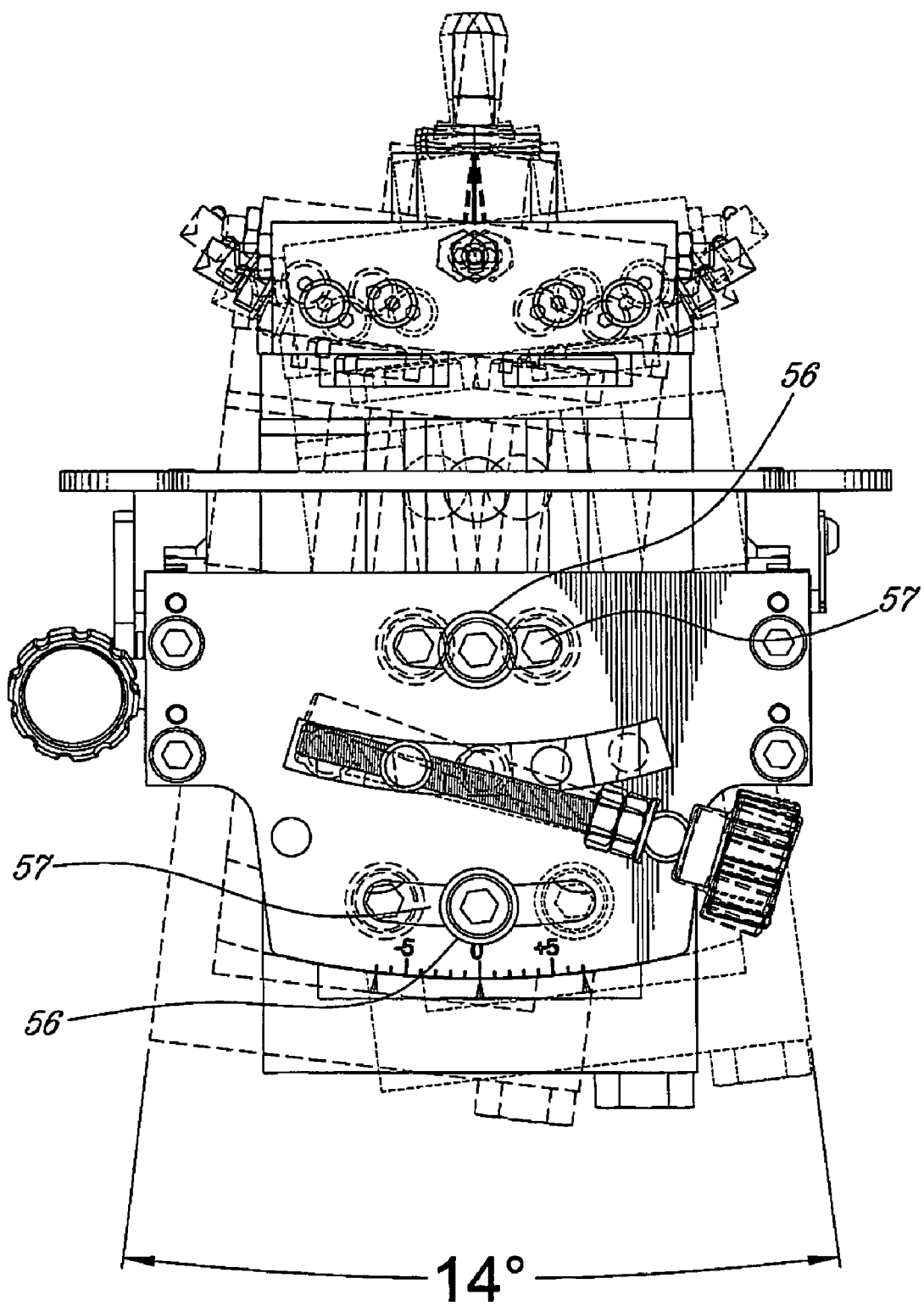
FIGS. 8A and 8B are respectively front and side elevational views of the gripper of FIG. 5; these figures illustrate possible tilting adjustments of a movable portion of the gripper with respect to a base plate thereof.
Figure 8B:
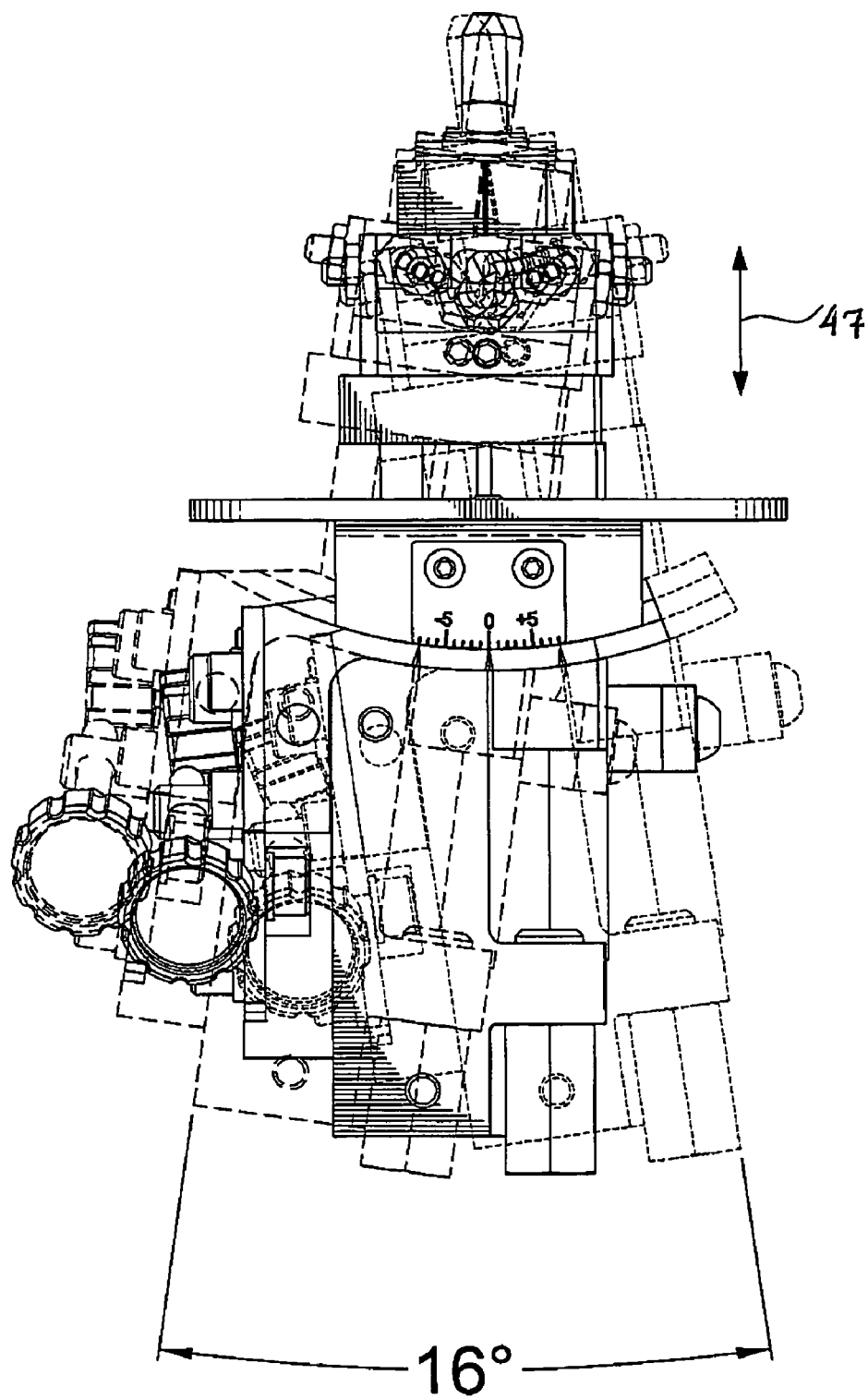

The adjusting assembly 36 includes a first tilting mechanism allowing the gripping assembly 32 to be tilted in the pivoting direction illustrated in FIG. 8A. The first tilting mechanism includes an adjuster 60 provided with a knob 61 to which is mounted a threaded rod 62. The threaded rod 62 is engaged in an aperture of a fixed anchor 64 which is pivotally mounted to the adjusting assembly 36. The threaded rod 62 is also threaded in a threaded aperture of a movable anchor 66 pivotally mounted to the body 46 via a curved plate 68 itself mounted to the support plate 58 and sliding in a curved slot 70. Two locking nuts 72 are also threaded to the threaded rod 62 between the anchors 64 and 66. It is to be noted that the apertures are repeated and placed in a symmetrical way on the adjusting plate 36 such as to allow a symmetrical mounting of the components of the first tilting mechanism, thus offering a better access and accomodation of the direction of any element to be positioned into the mold plates.

Rotation of the knob 61, and therefore of the threaded rod 62, by the user causes the tilting of the gripping assembly 32 as shown in FIG. 8A, since it either brings the two anchors 64 and 66 closer together or farther away from each other while maintaining the curved plate 68 into the curved slot 70. Also, rotation of the knob 61 in the desired direction determines the degree of tilting.

As can be seen from FIG. 8A, the tilting range in the first direction of the illustrated embodiment, given by the first tilting mechanism, is about 14 degrees. As shown in FIG. 8A, the fasteners 56 can be displaced in the respective curved slots 57 for proper angular adjustment.

Furthermore, once the desired tilting angle in the first tilting direction is reached (FIG. 8A), the fasteners 56 are tightened in order to lock and immobilize the gripping assembly 32 at that desired tilting angle in the first tilting direction.

Figure 7:
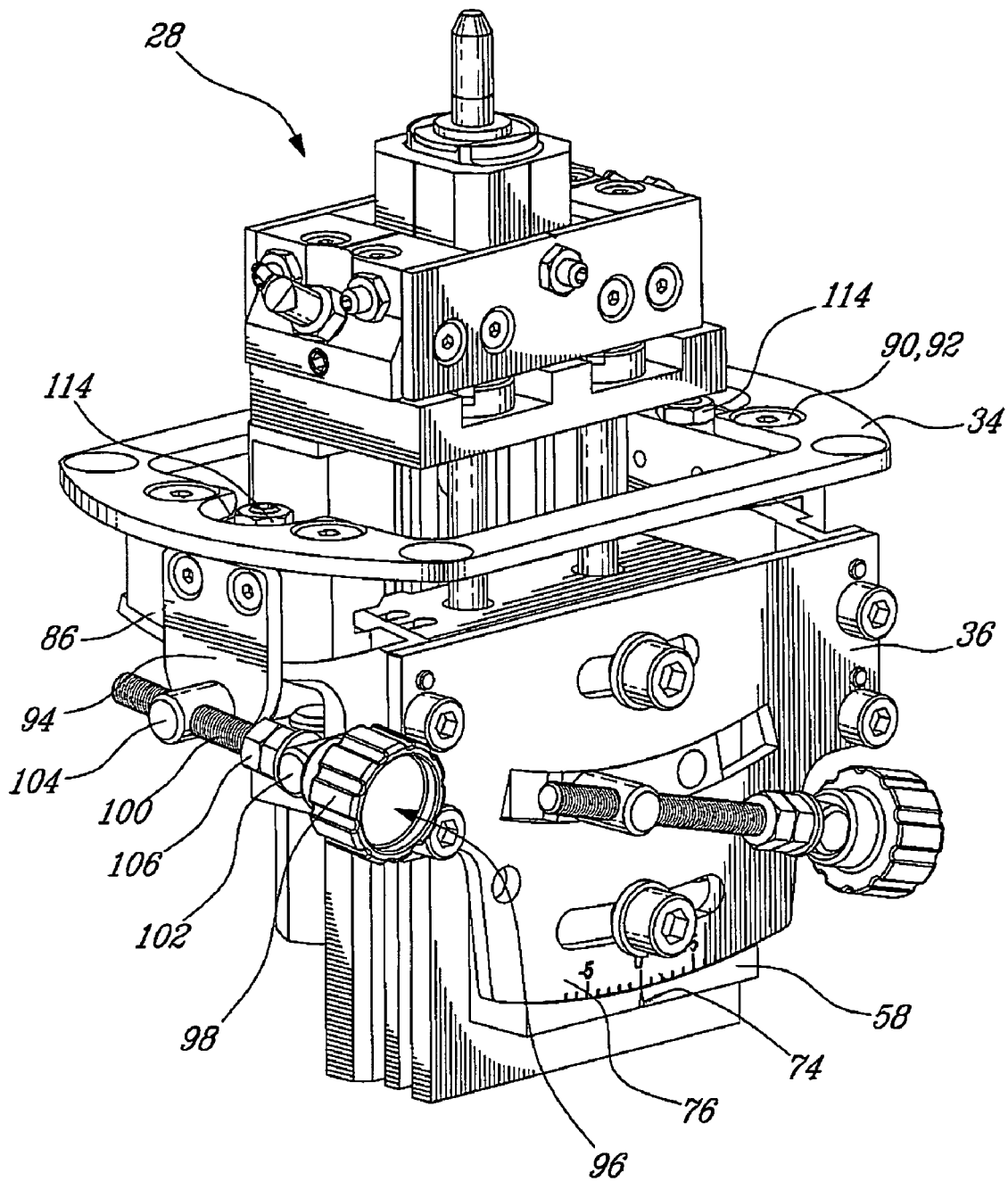
FIG. 7 is a third perspective view of the gripper of FIG. 5.

At the bottom of the support plate 58, as illustrated in FIG. 7, there is provided a precise marker 74 for the reading of a graduation. The graduation is given by a graduated scale 76, located at the bottom of the adjusting assembly 36. The graduated scale 76 is provided to help the operator during the tilting adjustment and to keep reference points for future positionings and adjustments of the gripping assembly 32. Since the support plate 58 is so mounted to the adjusting assembly 36 as to protrude one of its ends, then the graduated scale 76 is situated just above the marker 74, thus allowing the marker 74 to align with one graduation of the graduated scale 76. The marker 74 indicates the degree of tilting for the first tilting adjustment.

Returning now to FIG. 10, a second tilting mechanism will be described.

FIG. 10 illustrates generally L-shaped pieces 78 and 80 mounted to each of the two lateral edges of the adjusting assembly 36 through fasteners 82. More specifically, the short segment of the "L" of the pieces 78 and 80 is fastened to the adjusting assembly 36 and the longer segment of the "L" of the pieces 78 and 80 is generally curved and free to receive support blocks 84, 86 respectively. The longer segment of the L-shaped pieces 78 and 80 comprises a slider 88 and 112 so curved as to allow the support blocks 84 and 86 to swing when they are mounted thereto.

The fixed plate 34 is mounted to the supports blocks 84 and 86 via fasteners 90.

The support blocks 84 and 86 are both provided with a nut-and-screw position adjusting assembly 114 on the top surface thereof.

The support block 84 is mounted to the fixed plate 34 via fasteners 90 and threaded apertures 92. Moreover, on the internal surface of the support block 84, there is provided a notch so shaped and configured as to enable the support block 84 to fit snugly onto the slider 88 of the L-shaped piece 78.

Turning to FIGS. 7 and 10, the second support block 86 is identical to the first support block 84. The support block 86 is mounted to the fixed plate 34 via fasteners 90 and threaded apertures 92. The support block 86 includes a notch so shaped and configured as to fit onto the slider of the second L-shaped piece 80.

The second tilting mechanism includes the two support blocks 84 and 86, and a second adjuster 96 mounted between the support block 86 and L-shaped piece 80. The support block 86 includes a small plate 94 (FIG. 7) on which the adjuster 96 is mounted. The adjuster 96 comprises a knob 98 to which is mounted a threaded rod 100. The threaded rod 100 is engaged in an aperture of a fixed anchor 102 which is pivotally mounted to the L-shaped piece 80. The threaded rod 100 is also threaded in a threaded aperture of a second anchor 104 pivotally mounted to the small plate 94. Two locking nuts 106 are threaded to the threaded rod 100 between the anchors 102 and 104 to hold the first anchor close to the knob 98. Since the support blocks 86 and 84 are the same, they are interchangeable. Therefore, the second adjusting mechanism can be mounted to either the support block 86 or 84, offering thus a symmetrical assembly which allows for a greater flexibility of the gripper 28 and a better access to gripping elements.

Rotation of the knob 98, and therefore the threaded rod 100, by the user cause tilting of the gripping assembly 32 as shown in FIG. 8B, since it either brings the two anchors 102 and 104 closer together or farther away from each other along rod 62. The degree of tilting can be read from a graduated scale 108 as illustrated in FIG. 6. The graduated scale 108 is provided to assist the operator upon performing tilting adjustment and positioning. The graduated scale 108 is located on the external surface of the support block 84 just above a marker 110 provided on the slider 88 to read the graduation of the graduated scale 108.

As can be seen from FIG. 8B, the tilting range in the second tilting direction of the illustrated embodiment, given by the second tilting mechanism, is about 16 degrees.

Furthermore, once the desired tilting angle in the second tilting direction is reached, the nut-and-screw position adjusting assembly 114 located on the top surface of the support blocks 84 and 86 are tightened to lock the sliders 88 and 112 in the respective notches of the support blocks 84 and 86 and thereby lock in position the gripping assembly 32 along the second direction of tilting.

FIGS. 8A and 8B show the rotation center of the gripper 28. In order to keep the gripper 28 stable when changing tilting angles, the center of rotation is located on the surface of the element to be gripped and positioned. And for that purpose, the L-shaped pieces 78 and 80 are mounted as illustrated in FIGS. 8A and 8B. Those figures also show the stroke of the pneumatic cylinder 44 while in contact with the molding plates.

FIG. 5 shows the fixed plate 34 mounted to the gripping assembly 32 and the adjusting assembly 36 altogether. The fixed plate 34 has a central opening so configured and sized as to allow the gripping assembly 32 to move freely along the axial direction 47 (see FIG. 8B) or along the two orthogonal axial directions of FIG. 9. Once all the adjustments are determined with the two adjusters 60 and 96 (for the tilting movements), the holder 38 (for the axial movements in directions 50 and 52), and the pneumatic cylinder 44 (for the axial movement in direction 47), the fixed plate 34 can be mounted to the robot assembly 26 of the molding machine 20, in order for the gripper 28 to be functional and ready to grip and position precisely the pieces for the molding process.

Furthermore, it should be understood that even after the gripper 28 is mounted to the robot assembly 26, it is still possible to make some more adjustments on the gripper 28.

It should be noted that the tilting movements do not impact the translation movements nor the elevation movements, therefore, there is no special order to carry through the different steps of the adjusting process of the gripper 28.

It should be mentioned that the suction cup 42 and its corresponding mechanism to retain an element to be gripped is one method among many others to retain an element to be gripped. Other methods and mechanisms can be used and implemented. The method and mechanism used for gripping elements depend on the shape and nature of the elements to be gripped. In the same way, the shape of the base 40 is also flexible. Its shape depends on the element that the base 40 is to receive.

Although the present invention has been described hereinabove by way of preferred embodiments thereof, these preferred embodiments can be modified at will within the scope of the appended claims, without departing from the spirit and nature of the subject invention.

What is claimed is:

1. A gripping and positioning tool for a molding machine being provided with mold plates that are closeable for molding a part and a robot assembly to position objects prior to the closing of the mold plates the robot arm being movable between the spaced apart plates, the gripping and positioning tool comprising:

a structure for being positioned between the spaced apart mold plates when the robot arm is moved therebetween thereby being interfaced with a given mold plate, the structure being provided with a movable portion and a fixed portion; the movable portion extending from the fixed portion towards said given mold plate when the structure is positioned between the spaced apart mold plates, the fixed portion being so configured and sized as to be mounted to the robot assembly of the molding machine; the movable portion being so mounted to the fixed portion as to be adjustable along a plurality of orthogonal axes and tilting directions relative to the fixed portion; and a gripping element being mounted to the movable portion of the gripping and positioning tool;

wherein the combination of the tilting movements and the movements along the orthogonal axes provide for positional adjustment of the gripping and positioning tool.

2. A gripping and positioning tool as defined in claim 1, wherein the plurality of orthogonal axes and tilting directions comprises three orthogonal axes and two tilting directions.

3. A gripping and positioning tool as defined in claim 1, wherein the movable portion includes: an adjusting assembly so configured and positioned as to independently adjust the movable portion along the two tilting directions with respect to the fixed portion; and a body supporting the gripping element.

4. A gripping and positioning tool as defined in claim 3, wherein the adjusting assembly includes a first tilting mechanism so mounted to the body as to allow the gripping element to tilt along a first tilting direction with respect to the fixed portion.

5. A gripping and positioning tool as defined in claim 4, wherein the first tilting mechanism includes:

a fixed anchor mounted to the adjusting assembly;

a movable anchor pivotally mounted to the body via a curved plate; and an adjuster including a knob to which a threaded rod is mounted; the threaded rod being engaged with the fixed and movable anchor;

whereby rotation of the knob causes the tilting of the gripping and positioning tool in the first tilting direction by bringing the two anchors closer together or farther away from each other.

6. A gripping and positioning tool as defined in claim 5, wherein the first tilting mechanism further includes:

first and second locking nuts being threaded to the threaded rod between the fixed and movable anchors;

fasteners to block and immobilize the body and the adjusting assembly along the first tilting direction;

at least one graduated scale mounted to the movable portion; and at least a corresponding pointer to read the graduated scale.

7. A gripping and positioning tool as defined in claim 5, wherein a tilting range of the first tilting direction is about 14 degrees.

8. A gripping and positioning tool as defined in claim 4, further comprising a second tilting mechanism so mounted between the fixed portion and the adjusting mechanism as to allow the gripping element to tilt along a second tilting direction with respect to the fixed portion.

9. A gripping and positioning tool as defined in claim 8, wherein the second tilting mechanism includes:
   first and second support blocks mounted to the fixed portion;
   a fixed anchor pivotally mounted to one of the support blocks;
   a movable anchor pivotally mounted to the adjusting mechanism; and
   an adjuster including a knob and a threaded rod which is mounted to the fixed and movable anchors,
whereby rotation of the knob causes the tilting of the gripping and positioning tool in the second tilting direction by bringing the two anchors closer together or farther away from each other.

10. A gripping and positioning tool as defined in claim 9, wherein the second tilting mechanism further includes:
    two locking nuts being threaded to the threaded rod between the fixed and movable anchors;
    fasteners to block and immobilize adjusting assembly with respect to the fixed portion;
    at least one graduated scale mounted to the movable portion; and
    at least a corresponding pointer to read the graduated scale.

11. A gripping and positioning tool as defined in claim 8, wherein the tilting range in the second tilting direction is about 16 degrees.

12. A gripping and positioning tool as defined in claim 1, further comprising a translation mechanism so mounted to the movable portion as to allow the movable portion to move along a first orthogonal axis with respect to the fixed portion.

13. A gripping and positioning tool as defined in claim 12, wherein the first translation mechanism along the first orthogonal axis includes:
    a holder;
    a base so mounted to the holder as to be movable along the first orthogonal axis; and
    fasteners to lock the position of the base in the first orthogonal axis with respect to the holder.

14. A gripping and positioning tool as defined in claim 13, wherein the translation movement range in the first orthogonal axis is about 6.4 mm.

15. A gripping and positioning tool as defined in claim 13, wherein the translation mechanism is so mounted to the movable portion as to allow the movable portion to move along a second orthogonal axis with respect to the fixed portion.

16. A gripping and positioning tool as defined in claim 15, wherein the translation mechanism includes fasteners to lock the position of the base in the second orthogonal axis with respect to the holder.

17. A gripping and positioning tool as defined in claim 16, wherein the translation movement range in the second orthogonal axis is about 6.4 mm.

18. A gripping and positioning tool as defined in claim 15, further comprising a second translation mechanism allowing movements of the holder along a third orthogonal axis with respect to the fixed portion.

19. A gripping and positioning tool as defined in claim 18, wherein the second translation mechanism includes:
    a cylinder associated with the fixed portion; and
    a piston so mounted on the cylinder as to move the holder along the third orthogonal axis with respect to the fixed portion.

20. A gripping and positioning tool as defined in claim 1, wherein the gripping element comprises a suction cup to perform the gripping operation.

21. A gripping and positioning tool as defined in claim 20, wherein the suction cup is tubular and hollow.

22. A gripping and positioning tool as defined in claim 21, wherein the suction cup is further connected to an airway passage to withdraw air through a conduit such as to produce a suction to keep a gripped element in place during the gripping operation.

23. A gripping and positioning tool for a molding machine being provided with mold plates that are closeable for molding a part and a robot assembly to position objects prior to the closing of the mold plates, the gripping and positioning tool comprising:
    a structure defining a plurality of orthogonal axes and tilting directions, the structure being provided with a movable portion and a fixed portion;
    the fixed portion being so configured and sized as to be mounted to the robot assembly of the molding machine;
    the movable portion being so mounted to the fixed portion as to be adjustable along the plurality of orthogonal axes and tilting directions, the movable portion including an adjusting assembly so configured and positioned as to independently adjust the movable portion along the two tilting directions with respect to the fixed portion, and a body supporting a gripping element;
    the adjusting assembly including a first tilting mechanism so mounted to the body as to allow the gripping element to tilt along a first tilting direction with respect to the fixed portion; and
    the first tilting mechanism including a fixed anchor mounted to the adjusting assembly, a movable anchor pivotally mounted to the body via a curved plate; and an adjuster including a knob to which a threaded rod is mounted; the threaded rod being engaged with the fixed and movable anchor, whereby rotation of the knob causes the tilting of the gripping and positioning tool in the first tilting direction by bringing the two anchors closer together or farther away from each other,
wherein the combination of the tilting movements and the movements along the orthogonal axes provide for positional adjustment of the gripping and positioning tool.

24. A gripping and positioning tool as defined in claim 23, wherein the first tilting mechanism further includes:
    first and second locking nuts being threaded to the threaded rod between the fixed and movable anchors;
    fasteners to block and immobilize the body and the adjusting assembly along the first tilting direction;
    at least one graduated scale mounted to the movable portion; and
    at least a corresponding pointer to read the graduated scale.

25. A gripping and positioning tool for a molding machine being provided with mold plates that are closeable for molding a part and a robot assembly to position objects prior to the closing of the mold plates, the gripping and positioning tool comprising:
    a structure defining a plurality of orthogonal axes and tilting directions, the structure being provided with a movable portion and a fixed portion;

the fixed portion being so configured and sized as to be mounted to the robot assembly of the molding machine;

the movable portion being so mounted to the fixed portion as to be adjustable along the plurality of orthogonal axes and tilting directions, the movable portion including an adjusting assembly so configured and positioned as to independently adjust the movable portion along the two tilting directions with respect to the fixed portion; and a body supporting a gripping element;

the adjusting assembly including a first tilting mechanism so mounted to the body as to allow the gripping element to tilt along a first tilting direction with respect to the fixed portion a second tilting mechanism so mounted between the fixed portion and the adjusting assembly as to allow the gripping element to tilt along a second tilting direction with respect to the fixed portion wherein the combination of the tilting movements and the movements along the orthogonal axes provide for positional adjustment of the gripping and positioning tool.

26. A gripping and positioning tool as defined in claim 25, wherein the second tilting mechanism further includes:

two locking nuts being threaded to the threaded rod between the fixed and movable anchors;

fasteners to block and immobilize adjusting assembly with respect to the fixed portion;

at least one graduated scale mounted to the movable portion; and at least a corresponding pointer to read the graduated scale.

* * * * *